United States Patent
Godwin

(10) Patent No.: US 7,822,709 B2
(45) Date of Patent: Oct. 26, 2010

(54) BUILDING MANAGEMENT

(75) Inventor: Adrian Michael Godwin, Woking (GB)

(73) Assignee: Conssero PLC, Woking, Surrey (GB)

( * ) Notice: Subject to any disclaimer, the term of this patent is extended or adjusted under 35 U.S.C. 154(b) by 1269 days.

(21) Appl. No.: 10/312,324

(22) PCT Filed: Jun. 22, 2001

(86) PCT No.: PCT/GB01/02804

§ 371 (c)(1),
(2), (4) Date: Dec. 26, 2002

(87) PCT Pub. No.: WO02/01509

PCT Pub. Date: Jan. 3, 2002

(65) Prior Publication Data

US 2003/0172087 A1 Sep. 11, 2003

(30) Foreign Application Priority Data

Jun. 27, 2000 (GB) ................. 0015639.8

(51) Int. Cl.
G06F 17/00 (2006.01)
(52) U.S. Cl. ..................................... 707/617
(58) Field of Classification Search ............... 707/1–10, 707/100–104.1, 200–205; 705/42, 79; 304/7.29; 370/395.52; 379/88.17; 709/205, 206, 207, 709/219, 231, 239, 240, 243, 244
See application file for complete search history.

(56) References Cited

U.S. PATENT DOCUMENTS

| | | | |
|---|---|---|---|
| 5,416,781 A | 5/1995 | Ruiz | 370/524 |
| 5,565,855 A | 10/1996 | Knibbe | 340/3.51 |
| 5,623,258 A * | 4/1997 | Dorfman | 340/10.41 |
| 5,920,848 A * | 7/1999 | Schutzer et al. | 705/42 |
| 6,157,943 A * | 12/2000 | Meyer | 709/203 |

(Continued)

FOREIGN PATENT DOCUMENTS

DE 19857702 6/2000

(Continued)

OTHER PUBLICATIONS

K.L. Slepicka et al., Application of simulation to the banking industry, 1981, IEEE Press, Piscataway, NJ, p. 481-485.*

(Continued)

Primary Examiner—Diane Mizrahi
(74) Attorney, Agent, or Firm—Haynes and Boone, LLP

(57) ABSTRACT

A building events status network for monitoring building events such as the reporting of equipment failure and visits by third parties to a plurality of buildings replaces the traditional paper logs by providing at least one site terminal with a unique address at each building to be monitored. The terminals are connected at least to a remote web server at which a database is maintained of entry records such as fault logs, times of individuals using the site terminals to report a fault or record their access to a building in the network and status information concerning the nature and outcome of the event concerning the buildings. Preferably the internet is used as the network infrastructure and each terminal is provided with browser software that permits the user to access only the remote web server.

14 Claims, 1 Drawing Sheet

U.S. PATENT DOCUMENTS

| | | | |
|---|---|---|---|
| 6,178,362 B1* | 1/2001 | Woolard et al. | 700/295 |
| 6,178,409 B1* | 1/2001 | Weber et al. | 705/79 |
| 6,571,282 B1* | 5/2003 | Bowman-Amuah | 709/219 |
| 6,615,166 B1* | 9/2003 | Guheen et al. | 703/27 |
| 6,629,081 B1* | 9/2003 | Cornelius et al. | 705/30 |
| 6,633,878 B1* | 10/2003 | Underwood | 707/100 |
| 6,640,249 B1* | 10/2003 | Bowman-Amuah | 709/228 |
| 6,795,429 B1* | 9/2004 | Schuster et al. | 370/352 |
| 6,850,926 B2* | 2/2005 | Koike | 707/2 |
| 6,907,546 B1* | 6/2005 | Haswell et al. | 714/38 |
| 7,072,934 B2* | 7/2006 | Helgeson et al. | 709/203 |
| 7,080,078 B1* | 7/2006 | Slaughter et al. | 707/10 |
| 7,124,427 B1* | 10/2006 | Esbensen | 725/109 |
| 7,127,328 B2* | 10/2006 | Ransom | 700/286 |
| 2002/0040358 A1* | 4/2002 | Ikezawa et al. | 707/1 |
| 2002/0156700 A1* | 10/2002 | Gray et al. | 705/26 |

FOREIGN PATENT DOCUMENTS

| | | |
|---|---|---|
| EP | 0969687 | 5/2000 |
| EP | 9069365 | 5/2000 |
| JP | 09044713 | 2/1997 |
| WO | 9853430 | 11/1998 |

OTHER PUBLICATIONS

Commonweath of Australia, Plain English Guidelines to Information Privacy Principles 4-7: Advice to agencies about storage and security of personal information, and access to and correction of personal information, Feb. 1998, [www.privacy.gov.au/publication/HRC_PRIVACY_Publication.pdf] Government of Australia, ISBN 0642 222150, pp. 1-21.*

Facilities Management Resources How to: Setting Up and Maintaining a Facililties Database, Sep. 2003, ( http://www.frlink.com/ProResources/How to/article.cgi?BOM%20International:howto 0903.htm), pp. 1-4.*

Office Action dated Nov. 11, 2008 from Czechoslovakian Patent Application No. PV-2002-3696, with informal partial English translation (3 pages).

* cited by examiner

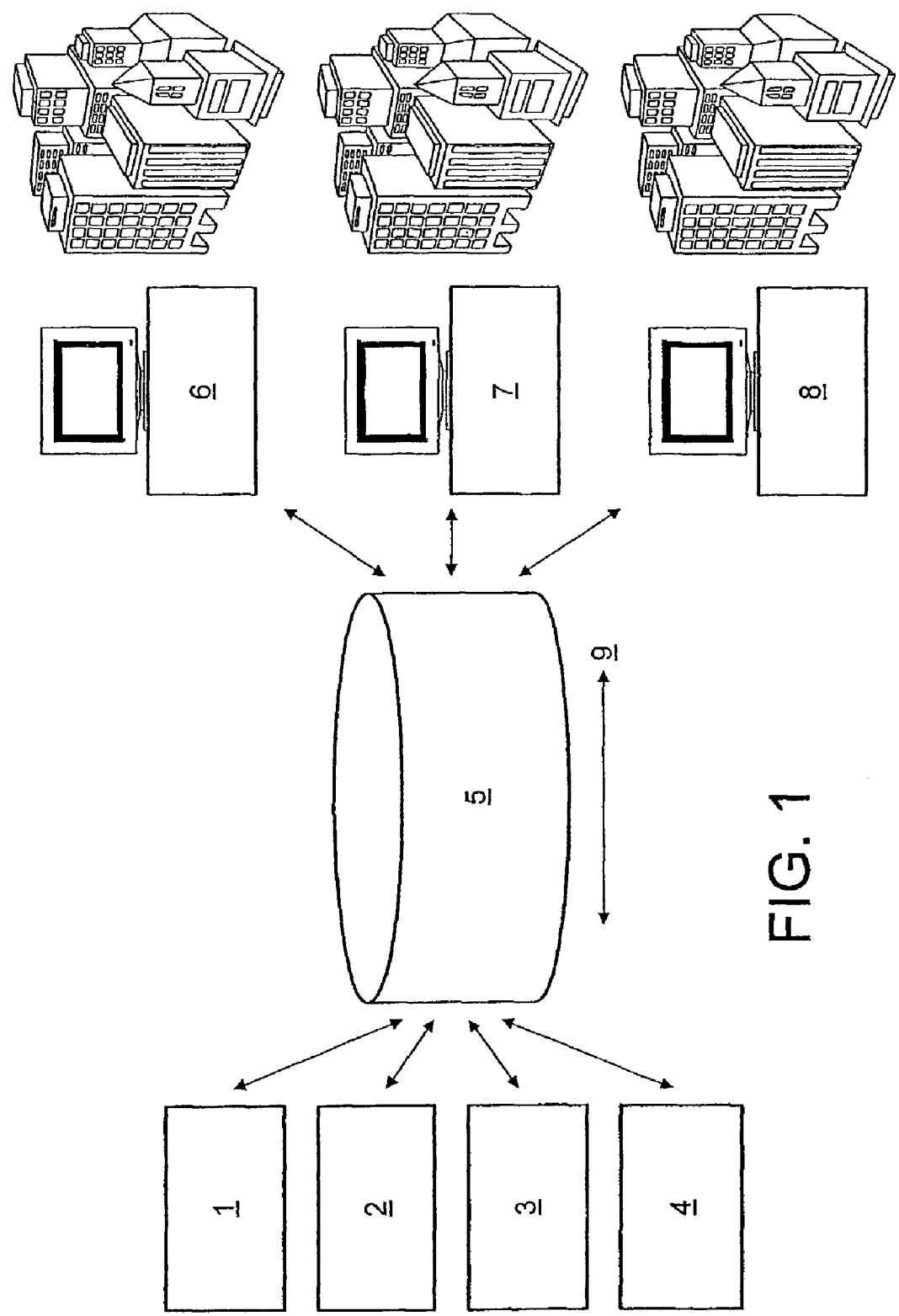

BUILDING MANAGEMENT

BACKGROUND OF THE INVENTION

The present invention relates to building management.

Modern commercial buildings contain a wide variety of machinery such as lifts, heating systems, lighting systems, air-conditioning systems and window cleaning systems etc. Typically, facilities managers within these buildings have dealt with equipment failures by logging a telephone call with a maintenance contracting company that responds by sending an individual to the building to diagnose and repair the fault.

In this specification we refer to the term "site events" to describe any event relating to the status of a building, its visitors or its equipment including without limitation the fact of a breakdown, the making of a fault report or repair request, the visit of an engineer on a planned maintenance visit or in response to a site request or the return to service of faulty equipment. Good building management requires the monitoring of these site events.

One type of site event—the tracking of visitors to buildings has, in the past, generally been by utilising log books and security sign-in forms etc to verify attendance at a building by parties such as maintenance contractors, insurance surveyors, consultants and others. More recently security systems have become fully computerised and building managers etc can make use of data about employees and others' entries and exits to a given building although without easily logging the purpose of such visits. The analysis of records of visits, time on site etc has for that reason been typically a painstakingly slow, inefficient and expensive analysis of manual records or, if computerised, suffering from an inability to link up multiple sites, buildings and types of visitors etc.

Therefore, systems do not exist to securely record information relating to events that occur in a building such as reporting equipment faults and status changes relating thereto, for example, whether a maintenance contractor has been called, their response time to arrive on site, time spent on site and the outcome of their visit etc. This creates an added level of complexity for data collection and analysis.

PRIOR ART

WO98/53430 A1 (Fox) describes a computer-based system to solve the technical problem of tracking and reporting attendance of individuals at continuing education activities. The system uses an identification device such as a magnetic card that has been provided to an individual prior to their attendance of an event. An identification card is read by an electronic card reader situated at the location of the educational activity. On entering the site of the educational activity, data from the identification card is electronically recognized by the card reader and stored. After all of the attendees have been identified, data stored in the card reader is transferred to a central computer. Information concerning the attendance of individuals at certain educational events can then be analysed and sorted to generate attendance reports etc.

U.S. Pat. No. 5,623,258 A (Dorfman) describes a system to solve a technical problem of monitoring the tour that a security guard must undertake in each building of a plurality of building sites. This patent teaches the use of a system that comprises of a system control center that has two-way communication via a telephone network with each of a large number of building sites. Within each building, a building site unit has a two-way communication by broadcast with a large number of tour station units. A guard with a guard identification card checks in through a card reader at each tour station unit. A unique tour station unit identification number is associated with the guard identification number and transmitted to the building site unit where it is associated with the time and date before being transmitted to the system control center. This system provides that a large number of sites and a large number of tour station units can all be monitored on a close to real time basis.

TECHNICAL PROBLEM

Building management companies face an increasing burden in managing the maintenance of building equipment since modern buildings use ever more sophisticated equipment and machinery. The problem is to monitor and manage these site events for any number of buildings efficiently. This problem has not been addressed by the prior art discussed above. The system proposed by Fox does not allow for real-time data transfer. The systems proposed by both Fox and Dorfman relate to specific unrelated problems.

SOLUTION OF THE INVENTION

The present invention provides a system for monitoring site events at a plurality of buildings, comprising a database accessible via the internet; a plurality of uniquely identified site terminals adapted to access the database by means of web browser software, each terminal having means for enabling a user with access rights to view and enter data on line into the database; at least one site terminal being physically secured at each said building such that the database provides current status information including entry records and times and associated information relating to site events for each building.

The invention is advantageous because the information held centrally on the database can be selectively accessed by owners, managers and tenants etc. of the buildings as well as contractors etc. and they can thus be made aware of the status of any building, its site events and site event history. Furthermore a management company and a building occupier have access to this information so that they are able to analyse the performance and reliability of building equipment and the contractors retained to carry out maintenance of that equipment.

The substance of a preferred embodiment of this invention is that by using a purpose-built stand-alone, robust, web browser enabled "site terminal" located within a building or building complex, with a unique internet address, a central database accessible via the internet can be updated in "real time" with details such as the reporting of an instance of building equipment failure, requesting repair of an item of equipment, recording the attendance of a maintenance contractor at the site, the time at which they leave the site and the outcome of their visit. The invention would also particularly be used to track and monitor visits by contractors, consultants, surveyors and others thereby enabling the recording of all visits and their purpose, outcome etc. The term "real time" is used to mean that changes made to the information held on the central database via a site terminal is instantaneous or near instantaneous either within the parameters of normal computer data transfer over the internet or within the parameters of normal computer data transfer using internet technology.

Visitors are given pre-assigned usernames, passwords etc. in order to utilise the web browser on the site terminal and interact with the database on a controlled and secure basis.

Generally speaking the geographical location of a computer with a "web browser" on a network or one connected to the internet is not a relevant factor in its use and operation.

The inventive step attributed to this new invention is firstly that it utilises a unique pre-loaded internet address, together with the fact that the purpose-built "site terminal" is securely fixed to a wall or part of the building fabric, to securely abstract, for example, the real-time event of a certain category of or named visitor arriving at or departing from the building and the purpose(s) and/or outcome(s) of the visit. It may also be used, for example, to report a "site request" e.g. a repair required to a piece of equipment or the failure of a piece of equipment etc. and record it on-line to the central database.

ADVANTAGES OF THE INVENTION

A purpose-built web browser enabled device, referred to as a "site terminal", located at a geographically remote building or site (and granted a unique internet address) is used to update and confirm, securely and unambiguously, the time and date of attendance of a visitor (assigned in advance a username, password etc.) to the building or site in question on a central database accessible via the internet in "real time". That "site terminal" is securely attached to the building fabric.

The web browser is designed to only allow interaction with a custom menu (dependent upon the type of visitor) held on a remote web server with a central database to confirm and record details of the event, the nature and purpose of the event e.g. a "site request" made to a company contracted, in some form, to be carrying out maintenance, inspection, building or surveying services etc. and/or the outcome of the visit e.g. a request has been logged and a contactor arrives after a certain number of hours etc. These details are transferred directly to the database in "real time" using the web browser facility.

In addition to tracking and recording details of site requests and the attendance of a diverse range of visitors, the database can be used by individuals in a building to record and monitor the status of site requests, the date/time of arrival and date/time of leaving and any outcome of visits by third parties. The central database can provide status information regarding any designated item of equipment, for example, or the response time of the attendance of a maintenance contractor to repair a fault or the time spent on site or outcome of a visit and whether any further work is needed after the visit etc.

The building owners, managers and/or any other authorised party may also be given access to the remote web server and database via a suitable web browser together with appropriate username and password and can see in "real time" whether committed and pre-arranged or contracted visits have been made, the time spent on site by the visitor etc. as well as the number and frequency of unplanned or emergency visits, call backs, site requests, breakdown attendances etc. indeed any facet or aspect of the visits that have taken place at the site and been recorded.

The use of a web browser in a similar fashion as described above by Owners, Tenants, Managing Agents, Contractors etc. enables them, via a custom menu, to report to the central database building defects, deficiencies or complaints to be actioned by contractors or others normally visiting the building under contract or by agreement with the building's owner or management. In addition, for example, the contractors' organisation can also set estimated times of arrival remotely for their attendance to the site and monitor the response time of contractors staff etc. to actually attend the sites and to clear reported faults, defects, deficiencies etc. using the site terminal facility.

This invention concerns a web browser based "real time" building visitor tracking system using a robust PC based "site terminal" with a unique internet address, which terminal is securely and permanently attached to the building fabric of the unique site concerned.

The use of a combination of usernames and passwords etc. delegated to the visitor in advance, enables a database on a remote web server to record securely and unambiguously the time of an event, for example, the logging of a site request, arrival of an individual, or departure of an individual from the building of all categories of events and the gathering of sundry details from the events concerning the status, purpose and outcome of the event. The design of the web browser on the "site terminal" is modified in order that any user using the site terminal is only allowed to interact with the remote web server database in a controlled manner and access to any other web site other than the remote web server database is precluded.

The combination of the web browser "site terminals" with their unique internet addresses located at each building being monitored and the geographically remote central database permanently connected to the internet allows building owners and managers to track and be updated in real time with confirmation of all the various types of events and the purpose of these events including but not limited to contracted maintenance services and/or statutory inspections etc. Confirmation of site events are thus achieved in a totally automated manner without recourse to paper based logbooks, log cards or attendance registers and the manual processing of data from them.

BRIEF DESCRIPTION OF THE DRAWING

In order that the invention may be well understood an embodiment thereof will now be described, by way of example only, with reference to the accompanying diagrammatic drawing, which shows the interaction of the site terminal (minimum one per building) over the internet and ability of all building staff and "visitors" to the building to interact with the database via the site terminal.

The novelty of the system lies in the use of a web browser not just simply to provide internet access to a database but by the time/date stamping of that interaction and the site stamping of the user's location via the unique internet address programmed into each "site terminal" enabling the database to confirm securely and unambiguously the event, the building the event relates to and the nature of the event given that the "site terminal" is securely fixed to the fabric of the building in question.

The site terminals 6, 7, 8 could, if required, be a standard PC with keyboard but in the context of this invention currently consists of a 307 mm diagonal SVGA TFT colour flat screen with a resistive coating touch screen capability and a Linux compatible keyboard overlay (sic "Virtual Keyboard") to allow user interaction. The PC is an Intel P333 MHz processor with 64 Mb of dram, 2.1 GB of hard disk with a 56 k PCMCIA modem. It utilises the Red Hat Linux 6.1 operating system running Netscape 4.72 web browser facility. It is configured to boot up with its home page being the appropriate database web site.

The concept of the site terminals 6, 7, 8 at each building and the internet access 9 of all the different types of events via the site terminals 6, 7, 8 to the central database 5 is depicted in the Figure. The remote interaction of other interested parties to enter and view data and reports etc. eg. owners 1, managing agents 2, contractors 3 and any others 4, are also shown.

In the context of this invention the central database 5 consists of a proprietary relational database supplied by the Commence Corporation "Commence 2000". "Commence 2000" is a relational database biased towards information management rather than numerical figures. It is classified as a RAD (rapid application development) tool. In addition customised Active Server Programming (ASP) has been carried out to work through the Commence Application Program Interface (API) to enable data to be interrogated and updated via standard web browsers using login usernames and passwords to control access.

By storing the internet addresses of the site terminals 6, 7, 8 on the database S the use of the site terminals 6, 7, 8 as a web browser limits directly the interaction of the user on the database to the time/date stamping of that interaction and the site stamping of the user's location via the unique internet address programmed into each site terminal 6, 7, 8. Thus the database 5 can record securely and unambiguously the event, the building in which the event has taken place and the nature of the event and its outcome given that the site terminals 6, 7, 8 are securely fixed to the fabric of the buildings in question. Indeed any menu driven series of questions and answers can be provided directly by the database 5 knowing the site concerned and the type of event being queried. In addition the site terminals 6, 7, 8 may be used by the building staff as a means of accessing the remote web server database 5 and interrogating the data, for example, about estimated time of arrival set by contractors in response to building equipment repair requests made using the site terminals 6, 7, 8 and to get status updates generally.

The invention claimed is:

1. A computer-implemented building management system for monitoring site events at a plurality of buildings, wherein a site event is an event relating to the status of a building, a building's visitor or a building's equipment, the system comprising:
    a database accessible via the internet;
    a plurality of uniquely identified site terminals that each access the database by means of web browser software, each terminal having means for enabling a user with access rights to view data and enter data on line into the database;
    wherein each of said buildings has physically secured or located thereat a respective one of said site terminals having a respective unique internet address that is used to identify the respective building at which that site terminal is physically secured or located,
    such that the database provides current status information including entry records and times and associated information relating to site events for each said building.

2. A system as claimed in claim 1, wherein the browser software permits the user to access only an internet site holding the database.

3. A system as claimed in claim 1, wherein each said site terminal includes means for reporting to the database by a user an instance of building equipment failure.

4. A system as claimed in claim 1, wherein each of said site terminals includes means for sending to the database a request for repair of an item of equipment.

5. A system as claimed in claim 1, wherein each of said site terminals includes means for recording in the database a visit of a maintenance contractor to the site.

6. A system as claimed in claim 5, wherein each of said site terminals includes means for recording in the database the time at which the maintenance contractor leaves the site and the outcome of the visit.

7. A system as claimed in claim 1, wherein each of said site terminals includes means for enabling a user to record in the database information about a visitor's entry to the building.

8. A computer-implemented building management system for monitoring site events at a plurality of buildings, wherein a site event is an event relating to the status of a building, a building's visitor or a building's equipment, the system comprising: a database accessible via the internet; a plurality of uniquely identified site terminals that each access the database by means of web browser software, wherein each of said buildings has physically secured or located thereat a respective one of said site terminals having a respective unique internet address, each of said site terminals having means for enabling a user with access rights to view data and enter data online into the database concerning a site event at said respective building at which that site terminal is physically secured or located;
    wherein the unique internet address of each site terminal is used by the database to identify the building at which the site terminal is physically secured or located, and wherein the database provides access to information relating to site events for each building.

9. A system as claimed in claim 8, wherein the browser software permits the user to access only an internet site holding the database.

10. A system as claimed in claim 8, wherein each said site terminal includes means for reporting to the database by a user an instance of building equipment failure.

11. A system as claimed in claim 8, wherein each of said site terminals includes means for sending to the database a request for repair of an item of equipment.

12. A system as claimed in claim 8, wherein each of said site terminals includes means for recording in the database a visit of a maintenance contractor to the site.

13. A system as claimed in claim 12, wherein each of said site terminals includes means for recording in the database the time at which the maintenance contractor leaves the site and the outcome of the visit.

14. A system as claimed in claim 8, wherein each of said site terminals includes means for enabling a user to record in the database information about a visitor's entry to the building.

* * * * *